Jan. 21, 1958  L. C. CHOUINGS ET AL  2,820,530
OPERATING MECHANISM FOR DISC BRAKES
Filed Feb. 23, 1954  2 Sheets-Sheet 1
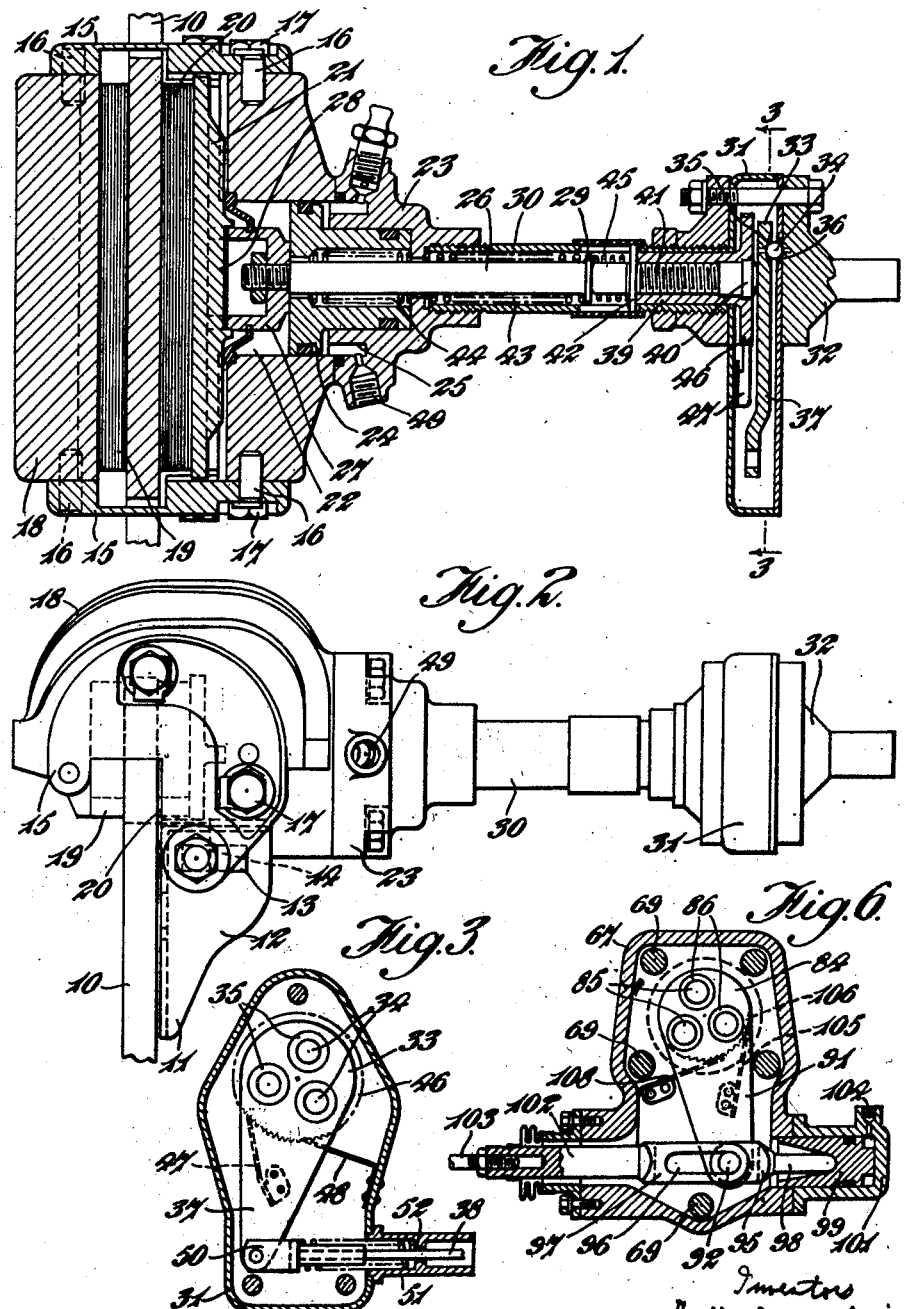

Jan. 21, 1958 L. C. CHOUINGS ET AL 2,820,530
OPERATING MECHANISM FOR DISC BRAKES
Filed Feb. 23, 1954 2 Sheets-Sheet 2

United States Patent Office 2,820,530
Patented Jan. 21, 1958

2,820,530

OPERATING MECHANISM FOR DISC BRAKES

Leslie Cyril Chouings and Eric Geoffrey Warnke, Leamington Spa, England, assignors to Automotive Products Company Limited, Leamington Spa, England Application February 23, 1954, Serial No. 412,002

1 Claim. (Cl. 188—73)

This invention relates to operating mechanism for disc brakes. Disc brakes of the spot disc type, in which non-rotating pads of friction material covering only a small portion of the area of a rotating disc engage the said disc on opposite sides, have been found to have many advantages for use on motor road vehicles, including smoothness of operation and efficient cooling, but it has been found difficult to provide for their operation from the customary handbrake lever for parking purposes as well as from a pedal for controlling the speed of the vehicle.

The object of the present invention is to provide an operating mechanism for disc brakes of the spot disc type which provides for satisfactory operation of the brakes by a handbrake lever or equivalent.

According to the present invention, in a disc brake of the type referred to having a pad which engages one side of the disc fixedly mounted in relation to a carrier member, and a second pad mounted on the said carrier member for movement parallel to the axis of the disc, the carrier member as a whole being itself mounted for movement parallel to the said axis, a cam housing is rigidly connected to the carrier member, and a cam means in the cam housing act through thrust transmitting means interposed between said cam means and the second pad to displace the second pad towards the first, the reaction of the said cam means being transmitted through the cam housing and carrier member to the first pad to urge it also towards the brake disc.

The carrier member may include a fluid pressure cylinder co-axial with the thrust transmitting means and containing a piston acting on the said second pad, or the cam means may be actuated to apply the pads to the disc by both fluid pressure and mechanical means.

Automatic adjusting means may be provided to adjust the effective length of the thrust transmitting means as the pads wear.

The invention is hereinafter described with reference to the accompanying drawings, in which:

Figure 1 is a sectional plan of one form of disc brake operating mechanism according to the present invention;

Figure 2 is an end view of the braks shown in Figure 1;

Figure 3 is a section on the line 3—3 of Figure 1;

Figure 6 is a section on the line 6—6 of Figure 4; and

Figure 4:
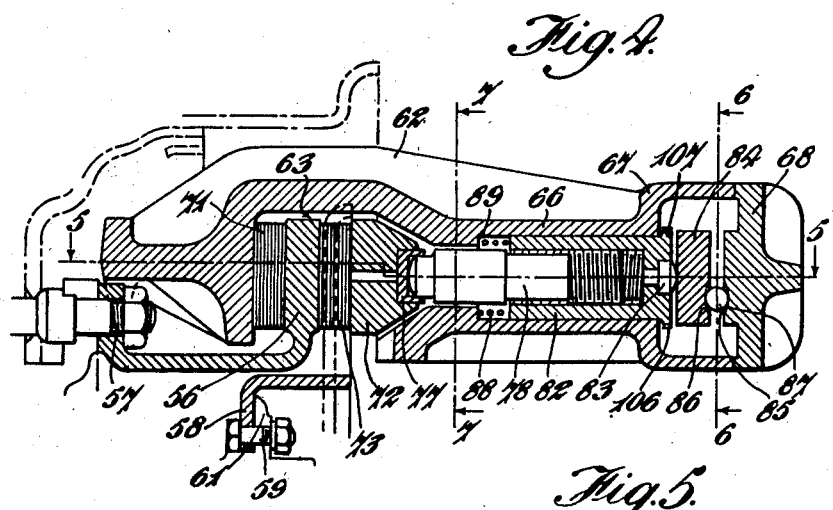
Figure 4 is a longitudinal section, similar to Figure 1, of another form of disc brake operating mechanism according to the invention.

Referring to Figures 1 to 3 of the drawings, which show a brake for a rear wheel of a motor road vehicle, a brake disc 10 is adapted for mounting on the rotating hub (not shown) of a vehicle rear wheel, in the same manner as the customary brake drum. A bracket 11 (Figure 2) is rigidly secured to a suitable flange on the axle casing supporting the axle on which the hub is mounted, the bracket 11 having end flanges 12 slotted as shown at 13 in Figure 2 to receive a bar 14 of square cross-section on which are mounted two end plates 15, 15 secured by dowels 16 and bolts 17 to a trough-like pad carrier 18 embracing the edge of the disc 10. A pad 19 of friction material is fixedly mounted on one side of the trough of the carrier, and a second pad 20 of friction material is mounted on a supporting plate 21 interposed between the other side of the trough and the disc 10. A bore 22 in the pad carrier 18 behind the pad 20 is closed at its outer end by a cap 23, and constitutes a cylinder in which is slidable a piston 24 capable of being urged inwardly by liquid pressure in an annular chamber 25. The piston 24 is tubular, and through it extends a rod 26 having secured to one end a cup-shaped member 27 the rim of which engages the rear surface of the supporting plate 21, the member 27 being notched to receive a rib 28 on the back of the supporting plate 21. The other end of the rod is formed with a flange 29. The flanged end of the rod extends into a tube 30 screwed into a recess in the rear end of the cap 23, the tube 30 carrying at its end remote from the cap 23 a cam housing 31 from which projects a trunnion 32 co-axial with the tube 30, the trunnion turning in a bearing (not shown) supported by a bracket from the rear axle casing of the vehicle. A disc 33, co-axial with the tube 30, is located in the housing 31, balls 34 being disposed between conical pits 35 in the disc 33 and conical pits 36 in the rear wall of the housing 31. The disc 33 carries a radial arm 37 (Figures 1 and 3) movable by means of a cable 38 connected to a handbrake lever (not shown), to turn the disc about its axis. An internally screw threaded sleeve 39 slidable in the tube 30 carries a pad 40 engaging the centre of the disc 33, and a rod 41 screw threaded to engage the internal screw thread in the sleeve 39 abuts against the flanged end of the rod 26, the sleeve 39, rod 41, rod 26 and member 27 together forming thrust transmitting means interposed between the disc 33 and the pad 20. The rod 41 is held against rotation by a diametral pin 42 engaging in longitudinal slots in the tube 30. A relatively strong compression spring 43 arranged between the cap 23 and the flange 29 urges the rod 26 rearwardly, and acts, through the cup-shaped member 27 to urge the piston 24 rearwardly. A lighter compression spring 44 urges the piston 24 forwardly against the member 27. Another light compression spring 45 acts between the flange 29 on the rod 26, and the diametral pin 42 to keep the pad 40 in contact with the disc 33 when the rod 26 is moved forwardly by the piston 24. The sleeve 39 is formed with a flange 46 having ratchet teeth on its edge as shown in Figure 3, which teeth are engaged by a pawl 47 carried by the arm 37, and by a holding pawl 48, the pawl 47 tending to turn the sleeve 39 during the return movement of the arm 37.

It will be understood that angular movement of the arm 37 will turn the disc 33 in the housing 31, and will thus cause the balls 34 to ride up the sides of the conical pits, applying a thrust through the sleeve 39, rod 41, rod 26, and cup-shaped member 27 to the friction pad 20. The reaction on the housing 31 is applied through the tube 30 and carrier 18 to the friction pad 19 and since the carrier 18 is free to slide in the direction of the axis of the disc 10 the two friction pads are thus applied to opposite sides of the brake disc 10. If the angular movement of the disc 33 is sufficient to move the pawl 47 into engagement with a fresh tooth on the flange 46, the sleeve 39 is turned during the return movement of the disc, and is thus moved axially with respect to the rod 41 to move the rod 26 forwardly and reduce the clearance between the friction pads and the brake disc 10.

The friction pads can also be applied to the brake disc by admitting liquid under pressure to the annular space 25 through an inlet orifice 49 (Figures 1 and 2) in the cap 23, to which is connected a conduit (not shown) leading to a liquid pressure master cylinder or other source of liquid pressure.

In the arrangement above described, the arm 37, as shown in Figure 3, is connected by a clevis 50 to the cable 38, and the cable passes through a tube 51 secured to the cam housing 31 and connected in the known manner to a handbrake lever or equivalent member. The cable 38 passes through an outer sheath (not shown) the end of which engages an abutment 52 in the tube 51. It will be understood that the arm 37 may be connected to the handbrake lever by a system of rods and levers instead of by the cable 38.

In the arrangement shown in Figures 4 to 7, the brake is operated by mechanical and liquid pressure means both acting through cam means similar to those described with reference to Figures 1 to 3. Referring to Figures 4 to 7 a brake disc 56 is bolted at 57 to the rotating hub of a vehicle rear wheel, and a bracket 58, bolted at 59 to a flange 61 on the axle housing, supports, for sliding movement in a direction parallel to the axis of the disc 56, a pad carrier 62. The pad carrier is formed with a trough-like opening 63 into which the brake disc 56 extends, and studs 64 extending across the opening 63 pass through apertures in ears 65 on the bracket 58. The pad carrier 62 includes a tubular portion 66 extending inwardly towards the longitudinal centre line of the vehicle, and a cam housing 67 at the inner end of the tubular portion 66, the cam housing being closed by a cover plate 68 secured in position by bolts 69.

Figure 7:
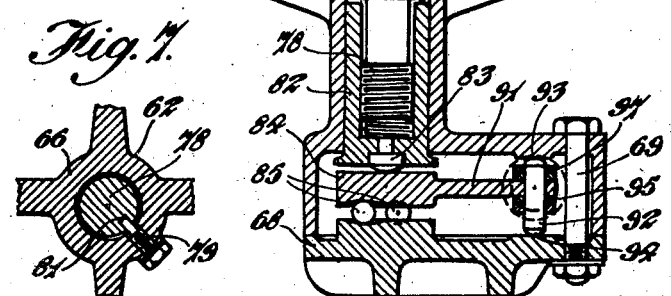
Figure 7 is a section on the line 7—7 of Figure 4.

A friction pad 71 is fixed to the wall of the trough-like opening 63 facing the outer side of the brake disc 56, and the other wall of the opening 63 is recessed to receive a block 72 on which is mounted the second friction pad 73. The block 72 is guided for sliding movement towards and away from the pad 71 by studs 74 mounted in the ends of the said block and engaging grooves 75 in pads 76 welded to the ears 65 on the bracket 58, and a cup-shaped abutment member 77 on the rear face of the block is engaged by a rod 78 movable axially in the tubular portion 66 of the pad carrier 62. The rod 78 is held against rotation, as shown in Figure 7, by a set screw 79 screwed into the tubular portion 66 and engaging a longitudinal groove 81 in the rod 78. The rod 78 is screw-threaded at its inner end to engage a sleeve 82 slidable in the tubular portion 66, the sleeve 82 carrying a contact button 83 engaging the centre of a disc 84 in the cam housing 67, and balls 85 are disposed between conical pits 86 in the disc 84 and similar conical pits 87 in the inner surface of the cover plate 68. A spring 88 acting between the sleeve 82 and a shoulder 89 in the tubular portion 66 urges the sleeve 82 towards the disc 84.

Figure 5:
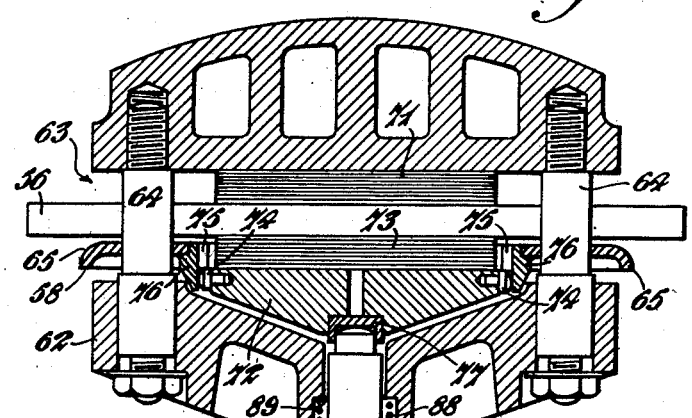
Figure 5 is a section on the line 5—5 of Figure 4.

Formed integral with the disc 84, as shown in Figures 5 and 6, is an arm 91 carrying at its outer end a pin 92 held against endwise movement by engagement with surfaces 93 and 94 on the front and rear walls of the cam housing the pin 92 passing through holes in the arms of a clevis 95, and through slots 96 in the arms of a second clevis 97, the arms of the clevis 97 lying outside the arms of the clevis 95.

The clevis 95 is integral with a thrust rod 98 engaging in the recessed end of a piston 99 slidable in a liquid pressure cylinder 101 secured to the cam housing, and the clevis 97 is formed with a stem 102 extending through an opening in the cam housing and coupled to a pull rod 103 forming part of a mechanical brake operating linkage. The liquid pressure cylinder 101 receives liquid under pressure from a pedal-operated master cylinder or other liquid pressure producing device, through an inlet port 104. The arm 91 has mounted on it a resilient pawl 105 co-operating with ratchet teeth 106 on a flange 107 formed on the sleeve 82, and a holding pawl 108 mounted on the wall of the cam housing 67 also co-operates with the ratchet teeth 106.

Liquid pressure acting in the cylinder 101 acts through the clevis 95 to turn the cam disc 84 and move the rod 78 axially to apply a thrust to the pad 73, the reaction on the cam housing being applied through the pad carrier to the pad 71, so that the pads are pressed against opposite faces of the brake disc 56. During such movement of the cam disc, the pin 92 slides in the slots 96 in the clevis 97, and that clevis remains stationary. A pull applied to the pull rod 103 similarly turns the cam disc, the clevis 95 moving with the arm but moving the thrust rod 98 away from the piston 99, which is thus left stationary, so that the volume of the working space in the cylinder 101 is not changed.

The pawl 105 acts to adjust the combined length of the rod 78 and sleeve 82 in the same manner as does the pawl 46 in the arrangement previously described.

We claim:

A disc brake comprising a disc mounted for rotation, a carrier member extending circumferentially over only a part of the disc and defining a channel into which the edge of the disc extends, means holding said carrier member against rotation, a first pad of friction material fixed to said carrier member on one side of said channel, a second pad of friction material, means supporting said second pad in said carrier member for sliding movement between the other side of said channel and said disc, a tube projecting outwardly from said other side of said channel parallel to the axis of the disc, a cam housing fixed to the end of the tube remote from said carrier member, a rod mounted for longitudinal movement in said tube and having thrust-transmitting engagement with said second pad, a sleeve, interengaging screw threads on said rod and sleeve, means to prevent rotation of said rod, cam means in said cam housing rotatable about the axis of said sleeve and operable to move said sleeve and rod towards said carrier member, ratchet teeth on said sleeve, and a pawl on said cam means engaging said ratchet teeth to produce uni-directional turning of said sleeve by movement of the cam means and thereby to increase the overall length of the rod and sleeve, said carrier being mounted for movement relative to said disc in the direction of the axis of the disc.

References Cited in the file of this patent

UNITED STATES PATENTS

| | | |
|---|---|---|
| 1,463,112 | Adenot | July 24, 1923 |
| 1,592,715 | Birkigt | July 13, 1926 |
| 1,875,095 | Milan | Aug. 30, 1932 |
| 2,245,987 | Lambert | June 17, 1941 |
| 2,351,041 | Hawley | June 13, 1944 |
| 2,539,090 | Leland | Jan. 23, 1951 |
| 2,612,969 | Hawley | Oct. 7, 1952 |
| 2,669,327 | Chamberlain et al. | Feb. 16, 1954 |
| 2,672,223 | Butler | Mar. 16, 1954 |